United States Patent
Koshika et al.

(10) Patent No.: US 6,799,608 B1
(45) Date of Patent: Oct. 5, 2004

(54) BENT PIPE AND A METHOD FOR PREPARING THEREOF

(75) Inventors: Hiroshi Koshika, Saitama (JP); Shinichi Nishimura, Kyoto (JP)

(73) Assignees: Fukuda Metal Foil & Powder Co., Ltd., Kyoto (JP); Japan Overlay Industries Co., Ltd., Iwatsuki (JP)

( * ) Notice: Subject to any disclaimer, the term of this patent is extended or adjusted under 35 U.S.C. 154(b) by 716 days.

(21) Appl. No.: 09/597,700

(22) Filed: Jun. 19, 2000

(51) Int. Cl.[7] ................................. F15D 1/02
(52) U.S. Cl. ................. 138/177; 138/39; 138/92; 138/178; 138/145; 285/16; 285/179.1
(58) Field of Search .............. 138/177, 178, 138/39, 145, 146, 92; 285/16, 179.1

(56) References Cited

U.S. PATENT DOCUMENTS

| | | | | |
|---|---|---|---|---|
| 584,968 A | * | 6/1897 | Taylor | 406/93 |
| 1,960,412 A | * | 5/1934 | Domina | 285/16 |
| 3,794,359 A | * | 2/1974 | Fisher | 285/55 |
| 4,130,300 A | * | 12/1978 | Sheridan | 285/16 |
| 4,189,317 A | * | 2/1980 | Patel | 75/252 |
| 4,251,170 A | * | 2/1981 | Sheridan | 406/197 |
| 4,653,777 A | * | 3/1987 | Kawatsu | 285/16 |
| 4,684,155 A | * | 8/1987 | Davis | 285/16 |
| 5,301,984 A | * | 4/1994 | Farris | 285/55 |
| 5,718,461 A | * | 2/1998 | Esser | 285/179 |
| 6,041,822 A | * | 3/2000 | Port et al. | 138/39 |

* cited by examiner

Primary Examiner—PAtrick Brinson
(74) Attorney, Agent, or Firm—Westerman, Hattori, Daniels & Adrian, LLP (57) ABSTRACT

There is an object to provide a technique of forming a proper abrasion resistance layer by a thermal spraying and fusing of a self fluxing alloy.

The object may be solved by cutting the pipe body along a curved face that is perpendicular to a plane including a central axis of the pipe body and that extends not to cross the inlet hole and the outlet hole but to include a part of the central axis. Thus the pipe body is divided into a first partitioned part having at least one of the inlet hole and the outlet hole, and a second partitioned part. An abrasion resistance layer is then formed on the inner surface of at least the outer bent portion of the pipe body by a thermal spraying and fusing of a self fluxing alloy. Thereafter, the first partitioned part is fitted into the second partitioned part for welding to obtain a bent pipe according to the present invention.

7 Claims, 6 Drawing Sheets

BENT PIPE AND A METHOD FOR PREPARING THEREOF

DETAILED DESCRIPTIONS OF THE INVENTION

1. Field of the Invention

The present invention relates to a bent pipe, more particularly a bent pipe having an inner diameter less than a medium dimension, having a fused abrasion resistance layer on its inner surface formed by a thermal spraying and fusing of a self fluxing alloy. The bent pipe according to the present invention may be preferably used in a pipeline for delivering synthetic resin pellets.

2. Background of the Art

Various methods have been conventionally taken for improving the abrasion resistance of the bent pipe used in a pipeline for transporting granulates or slurries.

Figure 4:
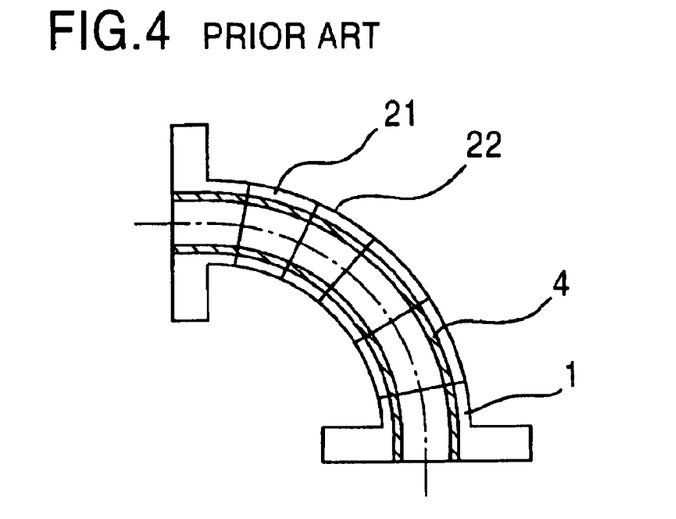
FIG. 4 is a figure illustrating a method for preparing a bent pipe according to prior art.

One of such methods is known as a method that an abrasion resistance metal is padded by welding on the inner surface of the bent pipe to form an abrasion resistance layer. While this method may however be relatively easily applied to the inner surface of the bent pipe having a larger diameter, it is impossible to pad it on the inner surface of the bent pipe having a medium or small diameter of 15 cm and less. In case of the bent pipe of medium or small diameter, there is another method for making a padding easy, showing FIG. 4. According to the method, a pipe 1 is cut in the direction to the center of a circle of the curvature of the bent pipe to be separated into a plurality of partitioned portions (22, 23 . . . ), followed by that an abrasion resistance metal is padded by welding on the inner surface of each of the separated parts before they are welded with the cut surfaces met together for integration. This method results in forming welded zones on the inner surface of the outer bent pipe portion. The obtained padded layer of the abrasion resistance metal may sometimes be integrated insufficiently or occur an undesired roughness. Also, the articles passing through the bent pipe may hit most intensely against the outer bent portion among the inner surfaces of the pipe body. Thus, when the welded zone is formed at the outer bent portion, from which an abrasion tends to be progressed so that the life of the bent pipe can not be sufficiently prolonged. Also, the bent pipe having an increased number of portions to be welded involves a trade off in the cost of preparing.

Figure 5:
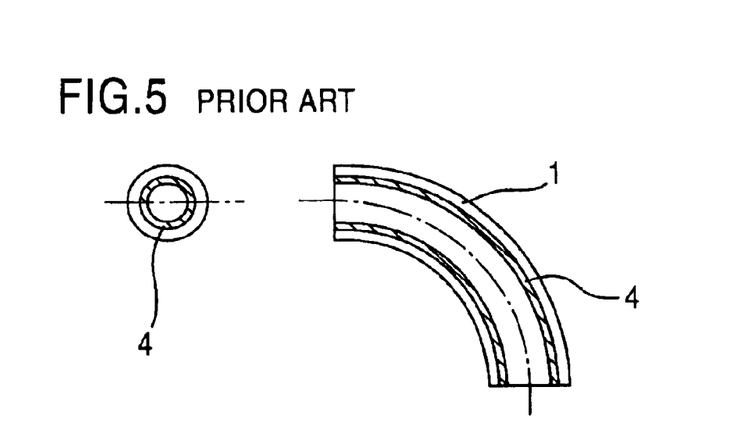
FIG. 5 is a figure illustrating another method for preparing a bent pipe according to prior art.

On the other hand, there is also known as a method illustrated in FIG. 5 wherein the pipe body 1 is cut along a curved face that includes the central axis and that is perpendicular to a plane including its central axis so as to be separated into two partitioned portions followed by that an abrasion resistance metal is padded by welding at the inner surfaces of these partitioned portions before each of the separated portions is met for welding together with their cut surfaces associated so as to obtain a unification. This method however has a drawback that since the pipe body is largely deformed in padding the abrasion resistance metal, an operation may be required for approximating the deformed body to the original shape. Further, since the end portions will not assume completely round sections, it is difficult to attach flanges to the end portions.

Another method is also known that the pipe body is partitioned at a plane including the central axis of the pipe body. This method is accompanied by forming a welded zone at an outer bent portion of the inner surface of the bent pipe, by which the obtained bent pipe can not provide a sufficiently prolonged life.

Figure 6:
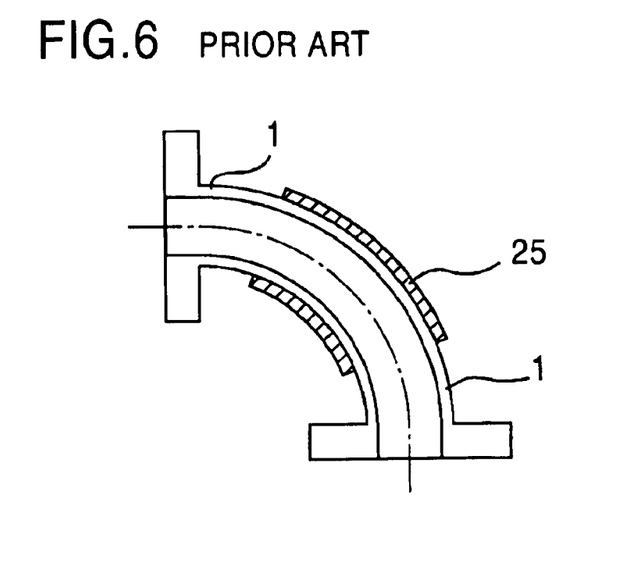
FIG. 6 is a figure illustrating another method for preparing a bent pipe according to prior art.

Further, there is a method that a padding layer of hard metal 25 is formed at an outer surface of the bent pipe body 1 followed by that the padding layer of hard metal 25 is covered with a coating layer of reinforced plastic, illustrated in FIG. 6, which is disclosed in Japanese Patent Publication No. 62-4598 (1987). This method may not accompany any problems relating to a welded zone since the pipe body is not cut, but accompany another problem that the bent pipe may abrade to intermingle the transported article with impurities since the bent pipe having an uncoated inner surface has a lower hardness, which sometimes contaminate the passing articles. Also, this method requires complicated treatment for covering the outer surface of the bent pipe with a reinforced plastic layer.

Therefore, there is an object to provide an improved technique for preparing a bent pipe with a proper abrasion resistance layer.

SUMMARY OF THE INVENTION

There is provided a bent pipe and a method thereof. This bent pipe is provided with a pipe body consisting of an outer bent portion and an inner bent portion. The pipe body has an inlet hole on one end of the pipe body, an outlet hole on the other end of the pipe body, and an inner surface extending to communicate the inlet hole with the outlet hole. The pipe body is then cut along a curved face. The curved face is perpendicular to a plane including a central axis of the pipe body and that extends not to cross the inlet hole and the outlet hole but to include a part of the central axis. Therefore, the pipe body is divided into a first partitioned part having at least one of the groups of the inlet hole and the outlet hole, and a second partitioned part. A self fluxing alloy is sprayed by thermal spraying and fused so as to form a fused abrasion resistance layer on the inner surface of at least the outer bent portion of the pipe body. Thereafter, the first partitioned part is fitted into the second partitioned part for welding to obtain a present bent pipe.

The first partitioned part may also include the outer bent portion having both of the inlet hole and the outlet hole.

Further, the fused abrasion resistance layer may preferably be formed on an edge of at least the inlet hole among the inlet hole and outlet hole.

The present invention is further clarified to those skills in the art by referring to the following description and appended drawings.

BRIEF DESCRIPTION OF THE DRAWINGS

Figure 1:
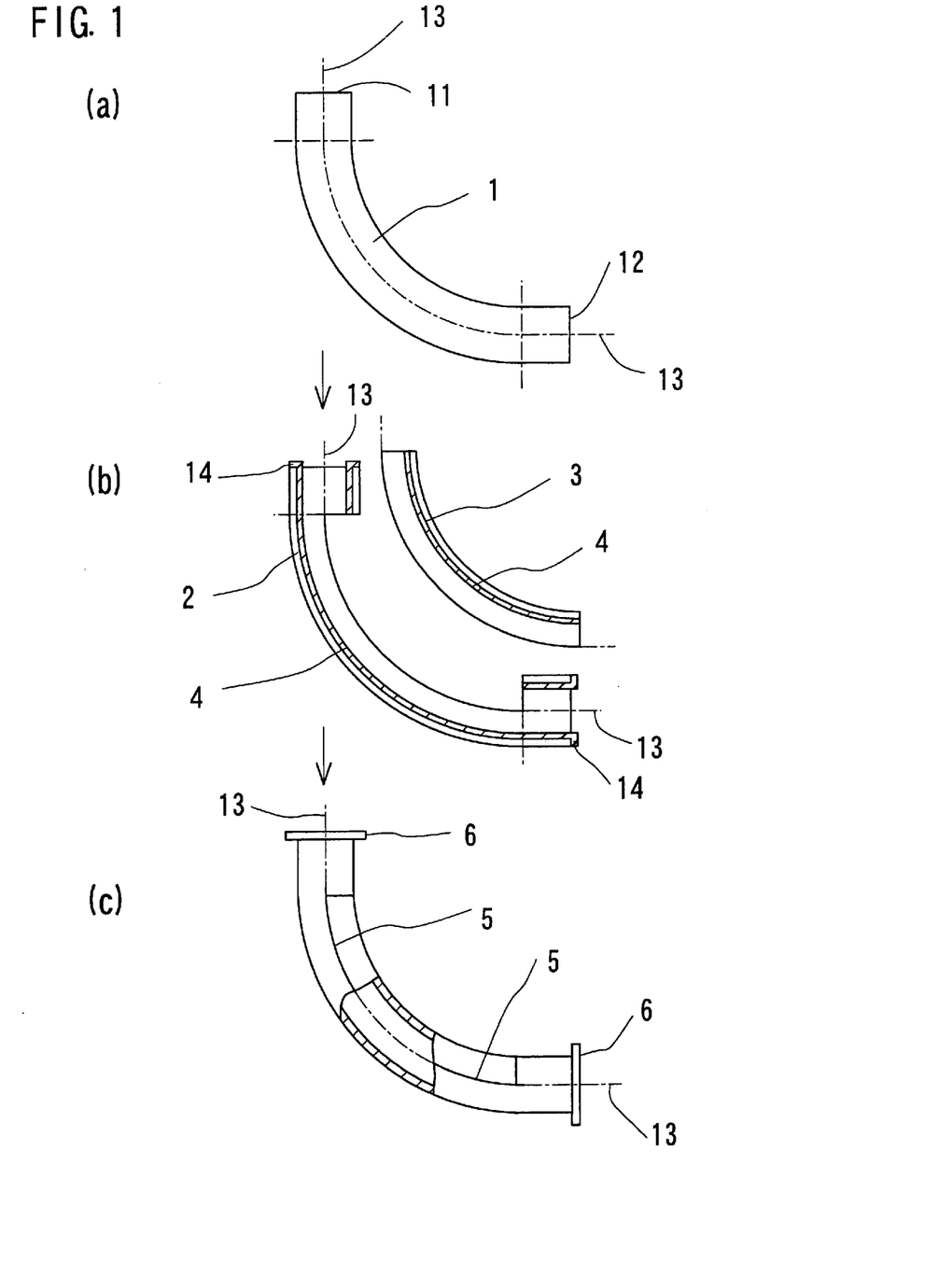
FIG. 1 is a figure illustrating a method for preparing a bent pipe according to the present invention.

FIG. 1 is a figure showing a method for preparing a bent pipe of one embodiment according to the present invention.

As illustrated in FIG. 1(a), a bent pipe body 1 has an inlet 11, an outlet 12 and an inner surface communicating the inlet with the outlet. It should be noted that the pipe body may be consist of an arbitrary material such as carbon steel, low alloy steel and stainless steel so long as a self fluxing alloy may be sprayed by thermal spraying and fused on it.

DETAILED DESCRIPTION FOR THE PREFERRED EMBODIMENT OF THE INVENTION

As illustrated in FIG. 1(*b*1), the pipe body 1 is cut along a curved face that is perpendicular to a plane including a central axis 13 of the pipe body and that extends not to cross the inlet 11 and the outlet 12 but to include a part of the central axis 13. Therefore, the pipe body 1 is divided into a partitioned portion 2 to be bent outwardly and a partitioned portion 3 to be bent inwardly for a thermal spraying and fusing of a self fluxing alloy on the inner surface of the partitioned portions 2, 3 as described hereinafter.

The above-described curved face is not only including the central axis 13 of the pipe body but also perpendicular to a plane including the central axis 13. Thus, the pipe body may be cut without a cut face to be welded located at a portion where the articles passing through it may hit most intensively.

Further, the above-described curved face does not cross the inlet 11 and the outlet 12 of the pipe body 1 so that the welded zone may not be located near the inlet hole and the outlet hole.

According to the present invention, the above mentioned curved face for cutting the pipe body I may produce any one of the divided forms as follows.

Figure 2:
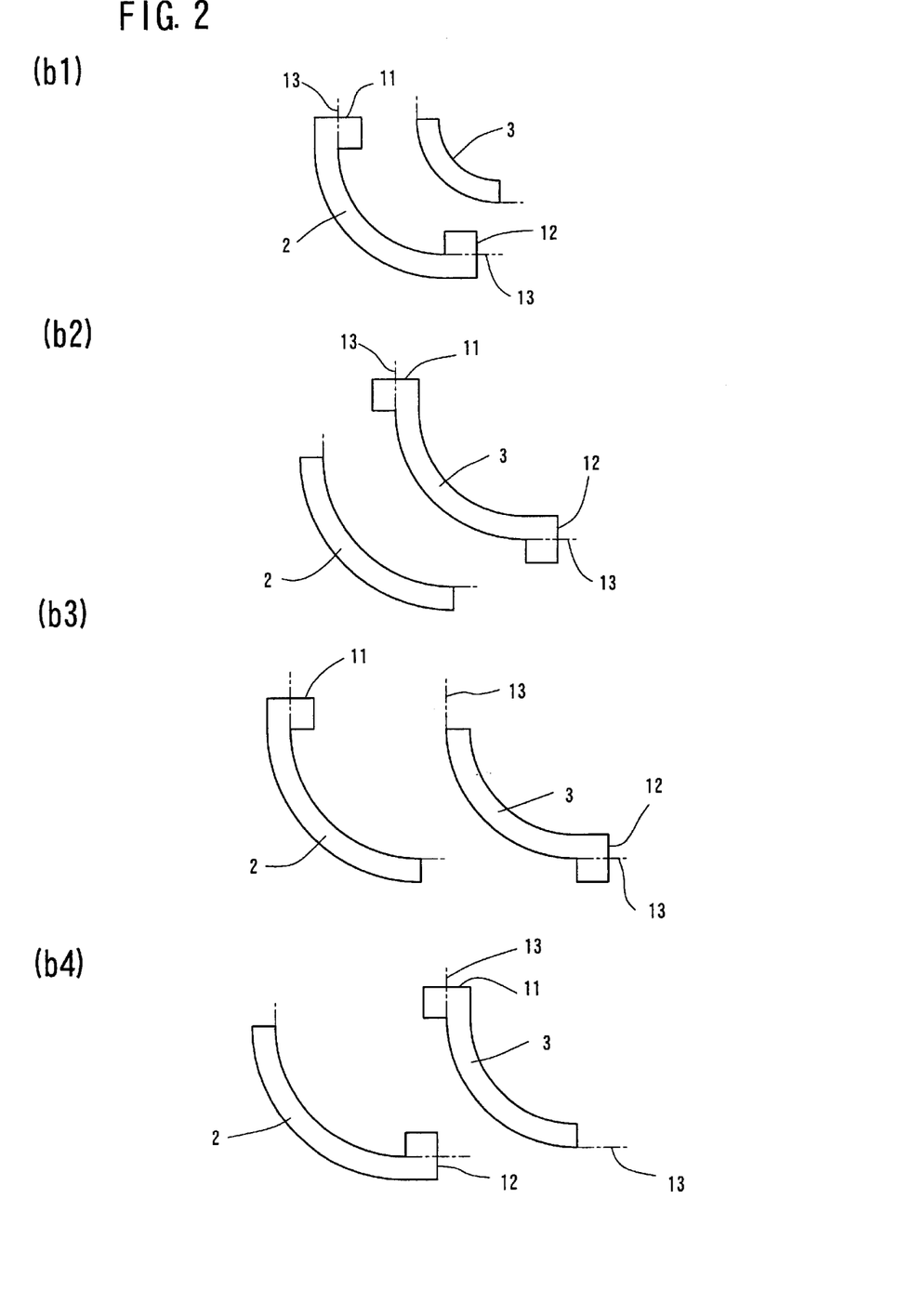
FIG. 2 is a figure illustrating another method for dividing a pipe body according to the present invention.

(1) A partitioned portion 2 to be bent outwardly including both end portions, that is the inlet 11 and the outlet 12, and a partitioned portion 3 to be bent inwardly (FIG. 2(*b*1)).

(2) A portioned portion 2 to be bent outwardly, and a partitioned portion 3 to be bent inwardly including both end portions, that is the inlet 11 and the outlet 12 (FIG. 2(*b*2)).

(3) A partitioned portion 2 to be bent outwardly including the inlet 11, and a partitioned portion 3 to be bent inwardly including the outlet 12 (FIG. 2(*b*3)).

(4) A partitioned portion 2 to be bent outwardly including the outlet 12, and a partitioned portion 3 to be bent inwardly including the inlet 11 (FIG. 2(*b*4)).

While the objects may be achieved in any one of the above cases in the present invention, it is preferable that the pipe body is partitioned in a manner as shown in FIG. 2(*b*1) or FIG. 2(*b*3), and more particularly, in a manner as shown in FIG. 2(*b*1).

Figure 3:
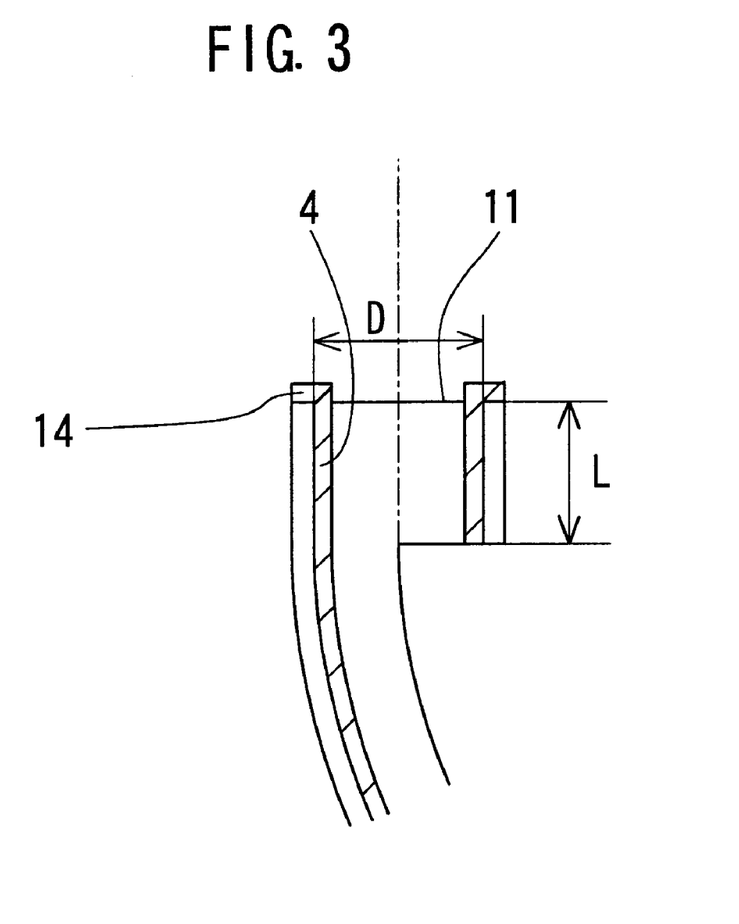
FIG. 3 is a figure magnified at an end portion of the pipe body according to the present invention.

According to the present invention, the curved face may not cross the inlet or the outlet but may intercross a side wall of the most outwardly or inwardly bent portion. Thus, an end portion extending from an edge portion to the intercrossed side wall of the most outwardly or inwardly bent portion may be produced with including the inlet 11 or the outlet 12. While the length L of the end portion may preferably range from half to double of the inner diameter D of the pipe body, as shown in FIG. 3, but not to be limited. With this arrangement, it is possible to perform the thermal spraying of a self fluxing alloy keeping a proper angle described hereinafter.

A self fluxing alloy is then sprayed by thermal spraying and fused on the inner surfaces of the partitioned portion 2 to be bent outwardly and the partitioned portion 3 to be bent inwardly so as to form a fused abrasion resistance layer 4.

The method comprises a process for forming a sprayed layer on the surface of the base material by a thermal spraying of a self fluxing alloy powder by utilizing a thermal spray gun such as a gas flame spray gun or a plasma spray gun, and a process for heating the base material and the sprayed layer up to the fusing point of the alloy so as to get rid of pores formed in the sprayed layer, to densify the sprayed layer, and to metallurgically combine the sprayed layer with the base metal. According to the present invention, this method may reduce the deformation which occurred in forming the fused layer of the self fluxing alloy. Since the fused layer of the self fluxing alloy has a superior abrasion and corrosion resistance, a uniformed thickness and a smooth surface, the present bent pipe has a uniformed and smooth fused layer of the self fluxing alloy formed on its inner surface.

According to the present invention, as described before, the pipe body is divided into an outer bent portion and an inner bent portion, so that the opening formed by the division may be used for the thermal spraying of the self fluxing alloy. A preferable sprayed layer may be obtained by executing it with a distance of 10 to 25 cm and an angle of 45° and less to the vertical direction for the spray. These conditions of the distance and the angle may be desired for the preferable spray of the self fluxing alloy toward the divided portion.

The self fluxing alloy useful for the present invention may be commercially available. A preferred self fluxing alloy powder according to the present invention may include a powder including 0 to 20% of Cr, 2 to 4% of B, 2.5 to 5% of Si, 0 to 1% of C, 0 to 5% of Fe and a remainder of Ni, by weight. It is also possible to utilize a self fluxing alloy powder further including a tungsten carbide powder or tungsten carbide-cobalt alloy powder.

The abrasion resistance layer of a self fluxing alloy may be formed at least at an inner surface of a partitioned portion to be bent outwardly, but preferably may be formed at all of the inner surface of the pipe body. The partitioned portion to be bent inwardly may be arranged to have the fused abrasion resistance layer to be thinner than that of the partitioned portion to be bent outwardly. Further, the partitioned portion to be bent inwardly may be arranged to have an abrasion resistance layer of a material different from that of the partitioned portion to be bent outwardly.

As shown in an enlarged manner in FIG. 3, the fused abrasion resistance layer 4 is preferably formed at an edge portion 14 of the pipe body, particularly at an edge portion 14 on the inlet 11 of the pipe body. Thus, the abrasion resistance layer on the edge portion 14 can prevent an abrasion from progressing from the edge portion 14.

Thereafter, the partitioned portion 2 to be bent outwardly is fitted into the partitioned portion 3 to be bent inwardly with their cut surfaces associated together for welding to thereby obtain a bent pipe according to the present invention. According to the present invention, the pipe body may be provided with an abrasion resistance layer without remarkably deforming the original shape of the bent pipe, so that an operation for restoring the deformed shape may be eliminated, which is necessary in the prior art.

If required, flanges 6 are attached to both ends of the bent pipes for simplifying connection with a straight pipe or another bent pipe comprising a pipeline. According to the present invention, the end portions of the bent pipe remain to be substantially round, so that the flanges 6 can easily be attached to the end portions. The end portion of the inlet or the outlet to be round may make a smooth connection for constructing a pipeline.

EXAMPLE

The present invention will be explained in more details in accordance with an embodiment thereof. A stainless steel pipe (JIS SUS 304) was prepared to have a pipe body with an outer diameter of 100 mm, an inner diameter of 83 mm and a radius of curvature of 500 mm. This stainless steel pipe comprises two straight pipe portions of 100 mm at both ends thereof. As observed from the direction perpendicular to a plane including the central axis of the bent pipe, the pipe body was started to cut from a side wall portion to be inwardly bent with leaving a distance of 80 mm from the inlet edge portion up to the central axis, then making progress to be cut along the central axis toward the outlet, followed by going forward to be separated at a side wall portion to be inwardly bent with leaving 80 mm from the outlet. A laser method was used for cutting in the example. A blasting using alumina grits was applied at the inner surfaces of the thereby obtained two partitioned portions before a self fluxing alloy was sprayed by using a gas flame powder spray gun.

The self fluxing alloy powder used in this embodiment has a composition of 17% of Cr, 3.5% of B, 4.5% of Si, 0.7% of C, 3.5% of Fe, 2.0% of Mo, 2.5% of Cu and a remainder of Ni, which corresponds to type JIS SFNi4 having a grain size of 45 to 105 $\mu$m.

Sprayed layer was formed to assume a thickness of approximately 1.5 mm at the inner surface of the partitioned portion to be bent outwardly and a thickness of approximately 0.7 mm at the partitioned portion to be bent inwardly. It was confirmed that the thereby obtained sprayed layer having a predetermined thickness appeared to be free from peels or cracks.

The partitioned portion with the self fluxing alloy formed at the inner surface thereof may be then put into an argon atmospheric electric furnace. The furnace was gradually raised in temperature up to 1,050° C. to be kept for 30 minutes, followed by that the power source was turned off for cooling the portions within the furnace. Thereby obtained layer appeared to be fused and exhibit smooth surface conditions. It was also observed that a proper sprayed layer 4 was free from peels between itself and the steel pipe.

While the partitioned portion was cut for microscopically observing the internal arrangement of the fused layer, no coarse pores or pinholes were observed in the fused layer, and it was observed that the layer was fused to form an alloy between itself and the base metal of the stainless steel pipe in a metallurgical manner.

A hardness of the fused layer was measured. The result exhibits that the layer has a Vickers hardness of Hv 650 to 750, which is assumed to be a sufficient hardness inherent to a thermal sprayed and fused layer of self fluxing alloy.

Thereafter, the cut surfaces of the two partitioned portions were met together for performing a weld bonding 5 by means of TIG welding utilizing a welding rod (JIS SUS 304) for a unification to thereby obtain a bent pipe. Before performing the welding, the cut surfaces were preliminary ground by means of a grinder for weld beveling. The partitioned part to be bent outwardly was then fitted into the partitioned part to be bent inwardly, and both partitioned parts were clamped together by using three vises at both end portions and a central portion thereof. While clamping, there was a slight clearance owing to the deformations of the pipe body, but the adjustment of the vises would solve the problem of the clearance.

Thereafter, flanges 6 were welded to both ends of the stainless steel pipe.

Thereby obtained bent pipe was utilized in a pipeline for delivering nylon resin pellets including 30 to 50% of glass fiber for more than three years, which has exhibited no outstanding abrasion in the inner surface of the bent pipe. It should be noted that the bent pipe of stainless steel without the fused abrasion resistance layer has approximately 6 months to 1 year. It is an unexpected result that the bent pipe according to the present invention may have a prolonged life by three to six times to the life of the bent pipe without the layer.

What is claimed:

1. A bent pipe having a pipe body consisting of an outer bent portion and an inner bent portion, comprising
   a) an inlet hole provided on one end of the pipe body,
   b) an outlet hole provided on the other end of the pipe body,
   c) an inner surface extending to communicate the inlet hole with the outlet hole, and
   d) an abrasion resistance layer formed on the inner surface of at least the outer bent portion of the pipe body, wherein the pipe body is cut along a curved face that is perpendicular to a plane including a central axis of the pipe body and that extends not to cross the inlet hole and the outlet hole but to include a part of the central axis, to thereby be divided into a first partitioned part having at least one of the groups of the inlet hole and the outlet hole, and a second partitioned part, and wherein a self fluxing alloy is sprayed by thermal spraying and fused on the inner surface of the pipe body to form an abrasion resistance layer followed by that the first partitioned part is fitted into the second partitioned part for welding.

2. A bent pipe according to claim 1 wherein the first partitioned part includes the outer bent portion having both of the inlet hole and the outlet hole.

3. A bent pipe having a pipe body consisting of an outer bent portion and an inner bent portion, comprising
   a) an inlet hole provided on one end of the pipe body,
   b) an outlet hole provided on the other end of the pipe body,
   c) an inner surface extending to communicate the inlet hole with the outlet hole, and
   d) an abrasion resistance layer formed on the inner surface of at least the outer bent portion of the pipe body, wherein the pipe body is cut along a curved face that is perpendicular to a plane including a central axis of the pipe body and that extends not to cross the inlet hole and the outlet hole but to include a part of the central axis, to thereby be divided into a first partitioned part having at least one of the groups of the inlet hole and the outlet hole, and a second partitioned part, and wherein a self fluxing alloy is sprayed by thermal spraying and fused on the inner surface of the pipe body to form an abrasion resistance layer followed by that the first partitioned part is fitted into the second partitioned part for welding, wherein the abrasion resistance layer is further formed on an edge of at least the inlet hole among the inlet hole and the outlet hole.

4. A method for preparing a bent pipe, comprising steps of
   a) providing a pipe body consisting of an outer bent portion and an inner bent portion, the pipe body having an inlet hole on one end of the pipe body, an outlet hole on the other end of the pipe body, and an inner surface extending to communicate the inlet hole with the outlet hole, and
   b) cutting the pipe body along a curved face that is perpendicular to a plane including a central axis of the pipe body and that extends not to cross the inlet hole and the outlet hole but to include a part of the central axis, to thereby be divided into a first partitioned part having at least one of the groups of the inlet hole and the outlet hole, and a second partitioned part, c) thermal spraying and fusing a self fluxing alloy to form an abrasion resistance layer on the inner surface of at least the outer bent portion of the pipe body, and d) fitting the first partitioned part into the second partitioned part for welding.

5. A method for preparing a bent pipe according to claim 4 wherein the first partitioned part includes the outer bent portion having both of the inlet hole and the outlet hole.

6. A method for preparing a bent pipe, comprising steps of a) providing a pipe body consisting of an outer bent portion and an inner bent portion, the pipe body having an inlet hole on one end of the pipe body, an outlet hole on the other end of the pipe body, and an inner surface extending to communicate the inlet hole with the outlet hole, and b) cutting the pipe body along a curved face that is perpendicular to a plane including a central axis of the pipe body and that extends not to cross the inlet hole and the outlet hole but to include a part of the central axis, to thereby be divided into a first partitioned part having at least one of the groups of the inlet hole and the outlet hole, and a second partitioned part, c) thermal spraying and fusing a self fluxing alloy to form an abrasion resistance layer on the inner surface of at least the outer bent portion of the pipe body, and d) fitting the first partitioned part into the second partitioned part for welding, wherein the first partitioned part includes the outer bent portion having both of the inlet hole and the outlet hole, and wherein the abrasion resistance layer is further formed on an edge of the inlet hole among the inlet hole and the outlet hole.

7. A bent pipe, comprising:

(i) a pipe body having an inlet hole and an outlet hole, comprising:

a first pipe body part including an outer bent portion; and a second pipe body part including an inner bent portion, the first pipe body part being welded with the second pipe body part at a curved face perpendicular to a plane including a central axis of the pipe body, the curved face including the central axis without crossing the inlet hole and the outlet hole; and (ii) an abrasion resistance layer fused on an inner surface of the first pipe body part by means of spraying a self fluxing alloy by thermal spraying.

* * * * *